United States Patent

[11] 3,533,486

| | | |
|---|---|---|
| [72] | Inventor | Elmir E. Paulson<br>Topsfield, Massachusetts |
| [21] | Appl. No. | 774,403 |
| [22] | Filed | Nov. 8, 1968 |
| [45] | Patented | Oct. 13, 1970 |
| [73] | Assignee | General Electric Company<br>a corporation of New York |

[54] JET ENGINE SILENCER WITH RETRACTABLE SOUND ABSORBING BODY
10 Claims, 5 Drawing Figs.

[52] U.S. Cl. .................................................. 181/50,
137/15.1
[51] Int. Cl. ................................................. F01n 1/10,
F01n 1/16, F02b 27/00
[50] Field of Search........................................ 181/33.
33.21, 33.22, 33.221, 33.222, 42, 50; 230/133(1D);
137/15.1, 15.2

[56] References Cited
UNITED STATES PATENTS

| 1,825,465 | 9/1931 | MacDonald.................. | 181/33.12UX |
|---|---|---|---|
| 2,933,891 | 4/1960 | Britt............................. | 181/33.222UX |
| 2,988,302 | 6/1961 | Smith............................ | 181/33.21UX |
| 3,165,165 | 1/1965 | Chapman...................... | 181/33.12UX |
| 3,174,582 | 3/1965 | Duthion et al................ | 181/33.222UX |
| 3,352,494 | 11/1967 | Colville et al................ | 181/33.222UX |

FOREIGN PATENTS

| 474,070 | 5/1951 | Canada .......................... | 181/33.222UX |
|---|---|---|---|
| 1,525,355 | 4/1968 | France .......................... | 181/33.221UX |
| 1,543,252 | 9/1968 | France .......................... | 181/33.221UX |
| 921,127 | 3/1963 | Great Britain................ | 181/33.21UX |

*Primary Examiner*—Robert S. Ward, Jr.
*Attorneys*—Derek P. Lawrence, Lee H. Sachs, Erwin F. Berrier, Jr., Frank L. Neuhauser, Oscar B. Waddell and Melvin M. Goldenberg

ABSTRACT: Improved means for suppressing sound within a fluid passage having a body of sound suppression material and means for moving and selectively positioning the sound suppression material within the fluid passage. In preferred form, the sound suppression material is movable between a stowed position, wherein the material is housed within the passage defining structure in noninterfering relationship to the fluid flow through the passage, and a deployed position, wherein the sound suppression material is disposed in an acoustically advantageous position within the fluid passage.

Patented Oct. 13, 1970

INVENTOR.
ELMIR E. PAULSON
BY
Erwin F Berrien Jr.
ATTORNEY

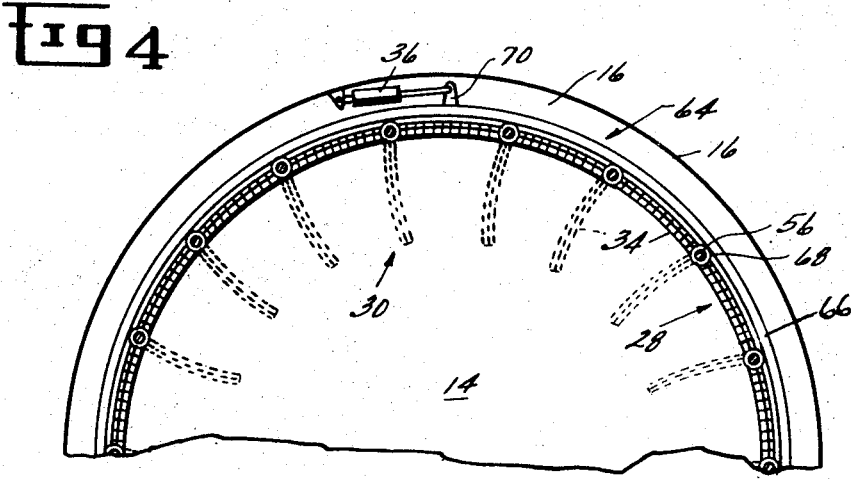
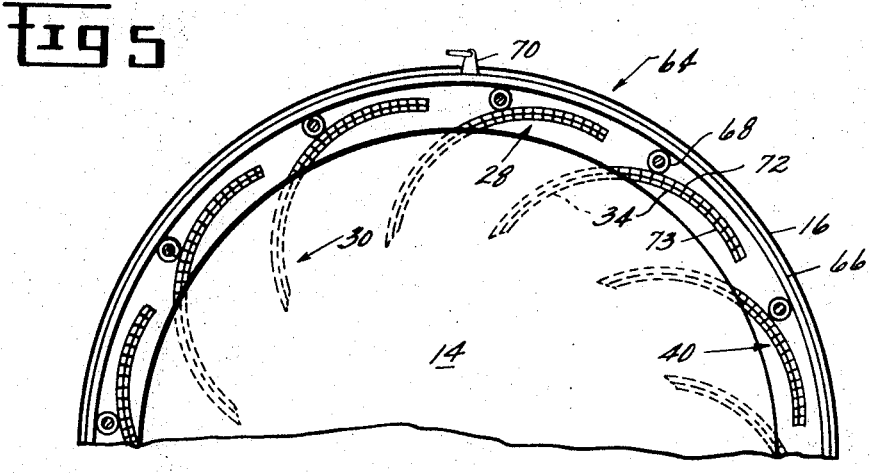

3,533,486

1

JET ENGINE SILENCER WITH RETRACTABLE SOUND ABSORBING BODY

IMPROVED MEANS FOR SOUND SUPPRESSION

This invention relates to fluid apparatus and, more particularly, to improved means for attenuating or suppressing noise generated by gas turbine engines.

Suppression of noise generated by gas turbine engines, particularly during aircraft takeoff and landing approach in the vicinity of highly populated areas, is a matter of increasing concern.

In today's generation of turbofan engines a large portion of the potentially objectionable noise is generated by the fan. While numerous acoustically advantageous proposals have been made to suppress, attenuate or otherwise control such fan-generated noise, such prior proposals generally result in undesirable losses in engine efficiency. For example, it has been proposed and is desirable from a purely acoustical standpoint that acoustically treated splitters, vanes or the like be provided within the fan duct to not only increase the overall treated area within the duct but to subdivide the duct into subpassages more conducive to sound suppression. However, any projection into the fan duct inherently obstructs and interferes with fluid flow therethrough causing, to some degree, efficiency losses in the engine. Such losses are particularly undesirable during the high altitude cruise portion of the normal flight regime where sound suppression is generally of minimal importance and engine efficiency is of great importance.

This invention, then, is concerned with means whereby efficient and effective sound suppression may be obtained during aircraft landing approach and/or takeoff without sacrifice of engine efficiency during high altitude cruise.

A primary object of this invention, therefore, is to provide sound suppressing means whereby high acoustical attenuation may be selectively obtained during the portions of the flight regime in which sound emission is a critical factor with minimal degradation to engine efficiency during the portions of the flight regime in which noise emission is of secondary concern.

A further object of this invention is to provide means for remotely positioning a body of sound suppression material within a fluid passage.

Yet another object of this invention is to provide means for moving a body of sound suppression material between a stowed position in noninterfering relationship to the fluid flow through a passage and a deployed position wherein the sound suppression material is disposed in an acoustically advantageous position within the passage.

The above and other objects, which will become apparent upon reading the following description of the preferred embodiments, are achieved in the present invention by providing a body of sound absorbing material carried by the passage-defining structure and means for moving or variably positioning the body of sound absorbing material within the passage. Both the body of sound suppression material and the positioning means may take a variety of forms. For example, the body of sound suppression material may be a panel of the resistive fibrous type, the resonant chamber type or a combination of the foregoing types. The positioning means may employ any suitable prime mover or actuator in combination with means responsive thereto to move the sound suppression material, preferably, between a stowed or retracted position, wherein such material is in noninterfering relationship to the fluid flow through the passage, and a deployed or extended, acoustically advantageous position within the passage.

While the specification concludes with claims particularly pointing out and distinctly claiming the subject matter of this invention, it is believed the invention will be better understood from the following description of the preferred embodiments taken in connection with the accompanying drawings wherein:

FIG. 4 is a cross-sectional view, like that of FIG. 2, showing a further embodiment of this invention; and FIG. 5 is a cross-sectional view, like that of FIG. 2, showing yet another embodiment of this invention.

Like reference numerals will be used to refer to like parts throughout the following description of the preferred embodiments.

Figure 1:
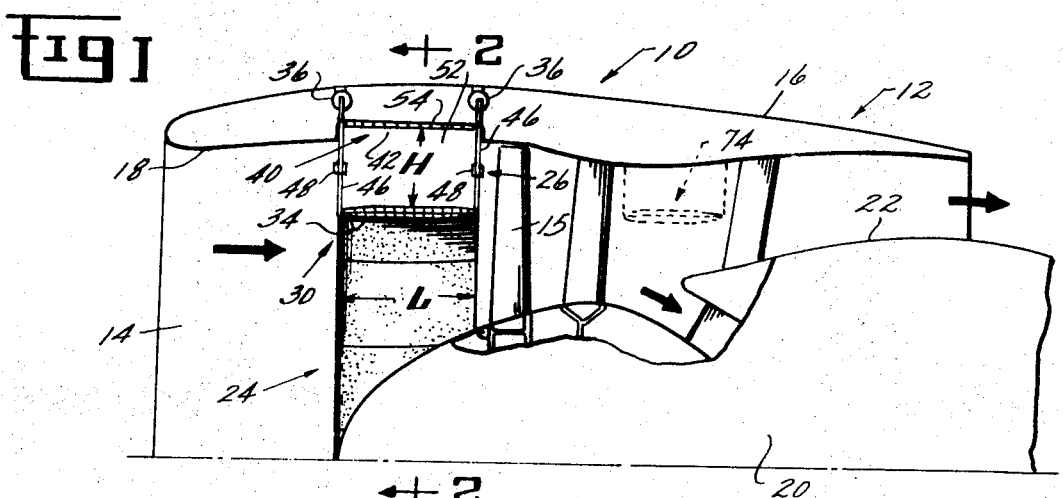
FIG. 1 is a partial, longitudinal half section of a turbofan engine, with portions broken away, showing an exemplary embodiment of the present invention.

Referring now to FIG. 1, the forward portion of an aircraft gas turbine engine has been shown at 10 as comprising a suitable structure 12, defining, in part, an annular fan duct passage 14 through which fluid is pressurized by a fan 15 to provide propulsive thrust for the engine 10. The structure 12 comprises a first portion or fan casing 16 defining, in part, an outer boundary 18 for the passage 14 and a second portion or nacelle 20 defining an inner boundary 22 for the passage 14.

In pressurizing fluid, the fan 15 generates noise which, as previously mentioned, is generally objectionable when the aircraft is operating at low altitude in the vicinity of highly populated areas. To enable efficient suppression of such fan generated noise and in accordance with the fundamental theme of the present invention, a body of sound absorbing material 24 is provided together with means 26 for moving and variably positioning the material 24 within the fan duct passage 14. The positioning means 26 are preferably adapted to move the material between a stowed or retracted position 28, wherein the body of sound absorbing material 24 is in noninterfering relationship with the motive fluid flow through passage 14, and a deployed or extended position 30, wherein the material 24 is disposed in an acoustically advantageous and efficient position within the passage 14.

The body of sound absorbing material 24 preferably comprises a plurality of sound absorbing panels 34 which may be of the fibrous type, the resonant chamber type, a combination of the foregoing types, or any suitable type adapted to absorb or suppress sound.

Although the present invention has been depicted and has and will hereinafter be described in connection with the fan duct passage 14, it should be understood that this invention may be effectively employed within other engine passages or by other passage-defining structures wherein sound suppression is desired only during selective portions of operation.

It will also be appreciated that the panel positioning means as well as other aspects of the present invention may be widely varied without departing from the invention's fundamental theme. For a better understanding of the invention, the exemplary embodiments of FIGS. 1—5 will now be described.

Figure 2:
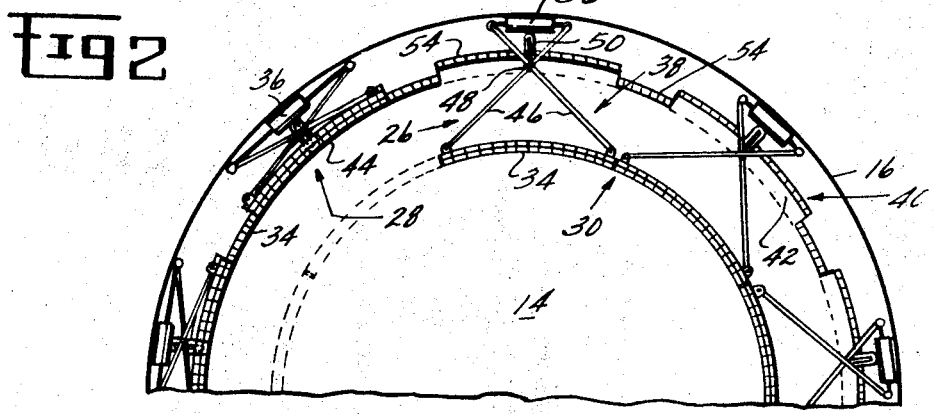
FIG. 2 is a cross-sectional view taken along line 2-2 of FIG. 1.

Referring first to the embodiment of FIGS. 1 and 2, the means 26 for moving and variably positioning the panels 34 within the passage 14 has been shown as comprising suitable actuator means 36 and linkage means 38 responsive thereto for radially translating each panel 34 between its stowed position 28 and its deployed position 30, wherein each panel 34 abuts each peripherally adjacent panel to form a substantially continuous ring or splitter within the passage 14.

As best shown in FIG. 2, recess means 40 are provided in the fan casing 16 for receiving the panels 34 when the latter are in the stowed or retracted position 28. In the embodiment of FIGS. 1 and 2, the recess means 40 have been shown as comprising a plurality of wells 42 arranged in peripherally spaced relationship about the passage 14. Each well 42 is sized to receive its respective panel 34 with the panel inner arcuate surface 44 defining a portion of outer boundary 18 of passage 14.

The actuator means 36 may conveniently comprise a fluid actuator of the well known type which is adapted to operate from pressures generated by the engine 10, although it will be understood that other suitable means such as a motorized screw actuator or the like may be used.

The linkage means 38 of FIGS. 1 and 2 have been shown as comprising a pair of intersecting or criss-crossed links 46 pivotally connected between their respective panel 34 and actuator means 36 so that when the actuator means is extended the panel translates radially outwardly toward its stowed position 28 and when the actuator means is retracted the panel translates radially inwardly toward its deployed position 30. To rigidize the linkage means 38, a floating fastener 48 may be provided at the intersection of the links 46 which is adapted to slidingly engage a radially disposed slot or track 50 carried by the fan casing 16.

To enhance sound attenuation in the deployed position 30, the panels 34 and the positioning means 26 may be sized, in accordance with the teachings of copending application Ser. No. 693,655 filed Dec. 12, 1967 and assigned to the assignee of this application, so that the axial length (designated L in Fig. 1) is great as compared with the radial height (designated H in FIG. 1) of the subpassage 52 formed between the splitter and the outer boundary 18.

To further enhance the overall sound attenuation, a second body of sound suppressing material 54 may be used to line recess means 40 so that when the panels 34 are deployed, the second body is placed in sound suppressing communication with the passage 14. The sound suppressing material 54 may also be applied to the other surfaces defining the passage 14.

Figure 3:
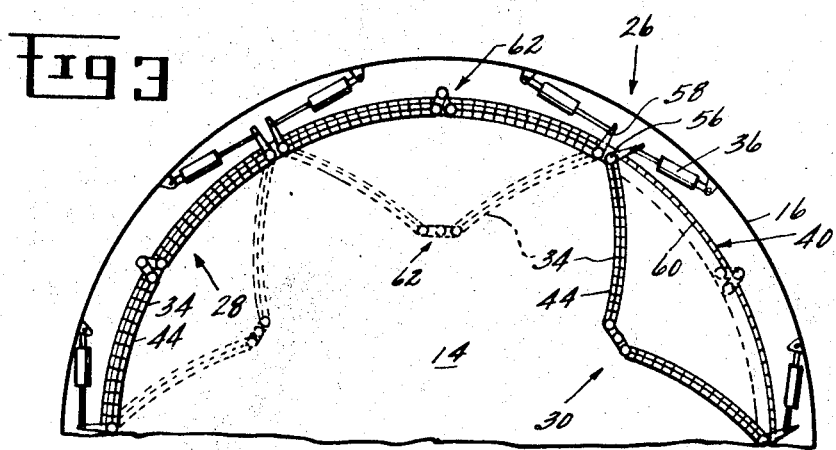
FIG. 3 is a cross-sectional view, like that of FIG. 2, showing another embodiment of this invention.

Turning now to the embodiment of FIG. 3, each panel has been shown as being hingeably connected at 56 to the fan casing 16 with the positioning means 26 adapted to rotate each panel 34 between its stowed position 28 and its deployed position 30. Like the embodiment of FIGS. 1 and 2, the positioning means 26 includes suitable actuator means 36 and means responsive thereto, taking the form of a crank arm 58, for moving the panel 34.

In the embodiment of FIG. 3 the recess means 40 is formed as a generally continuous inwardly facing peripheral slot 60 sized to retractably receive the panels 34 so that the inner panel surface 44 forms a portion of the passage outer boundary 18.

To provide additional support for the panels 34 when they are in the deployed or extended position within the passage 14, the panels 34 may be arranged in oppositely rotating pairs with hinge means 62 joining the free ends of each pair.

A further embodiment has been shown in FIG. 4 wherein each panel 34 is again hingeably connected at 56 to the first structural portion 16. In this embodiment, however, gear means 64 responsive to the actuator 36 are used in lieu of the linkage means 38 of FIGS. 1—3. In FIG. 4, the gear means 64 comprise a ring gear 66 rotatably carried by the fan casing in engagement with a suitable spur gear 68 carried by each panel 34 about its hinge 56. Actuator means 36 may then be operatively connected to a lug 70 projecting from the ring gear 66 to provide rotation to the ring gear 66 and, hence, enable positioning of the panels 34 between the stowed position 28 and the deployed position 30.

In FIG. 5 a modified form of the gear means 64 has been shown wherein the ring gear 66 engages a plurality of spur gears 68 each of which, in turn, engages a gear track 72 carried by its respective panel 34. It will also be noted that in the embodiment of FIG. 5 the recess means 40 take the form of a plurality of arcuate slots 73 formed in the fan casing 16, each sized to slidably receive its respective panel 34.

In operation, the sound suppression panels 34 may be remotely and selectively positioned in the stowed position, the deployed position or any intermediate position. Accordingly, for example, during the cruise portion of a flight where engine efficiency is of primary importance and sound suppression is of secondary importance, the panels may be stowed, preferably in a position presenting minimum obstruction to fluid flow through the passage 14. When enhanced noise suppression is desired, for example during medium altitude holding flight prior to landing approach, the panels may be partially deployed. And when maximum noise suppression is desired, for example, during low altitude landing approach, the panels 34 may be fully deployed within the fan duct passage.

While the sound suppression panels 34 have been shown in FIG. 1 disposed upstream of the fan 15, it should be understood that they may be effectively located in other areas of the fan duct, for example as indicated by the phantom lines at 74, as well as within other engine passages.

Although several embodiments of the invention have been depicted and described, it should be understood that such are intended to be exemplary only and not definitive and that many additions, alterations and variations may be made thereto without departing from the invention's fundamental theme.

I claim:

1. In a gas turbine engine of the type having structure defining a fluid flow passage and enclosing a sound source, the improvement comprising:

a first body of sound absorbing material carried by said structure;

recess means formed in said structure and sized to receive said body of sound absorbing material; and means for moving said first body of sound absorbing material between a retracted position, wherein said first body of sound absorbing material is disposed, at least in part, within said recess means, and an extended, acoustically advantageous position within said passage.

2. The gas turbine engine of claim 1 further characterized in that said first body of sound absorbing material is disposed in substantially non-interfering relationship to the fluid flow through said passage when in said retracted position.

3. The gas turbine engine of claim 2 further characterized in that said first body of sound absorbing material defines a portion of the boundary of said passage when in said retracted position.

4. The gas turbine engine of claim 2 further characterized by and including a second body of sound absorbing material fixedly carried by said structure and lining said recess means to thereby enhance the sound attenuation within said passage when said first body of sound absorbing material is out of said retracted position.

5. The gas turbine engine of claim 2 further characterized in that said passage is annular, said structure including a first portion defining, in part, the outer boundary of said passage and a second portion defining the inner boundary of said passage, with said recess means formed in said first structural portion.

6. The gas turbine engine of claim 5 further characterized in that said first body of sound absorbing material comprises a plurality of arcuate, acoustically treated panels, retractably disposed in peripheral spaced relationship within said recess means, said moving means including an actuator and linkage means responsive thereto for translating each said panel radially inwardly into said extended position wherein each said panel abuts each peripherally adjacent panel to form a substantially continuous ring of sound absorbing material generally concentrically disposed within said passage.

7. The gas turbine engine of claim 5 further characterized in that said first body of sound absorbing material comprises at least one acoustically treated panel, said panel being hingeabiy connected adjacent one edge thereof to said first structural portion, with said moving means including an actuator and means responsive thereto for rotating each said panel between said retracted position and said extended position.

8. The gas turbine engine of claim 7 further characterized in that said means responsive to said actuator includes a ring gear rotatably carried by said first structural portion and operatively engaging a spur gear carried by said panel about said hinge connection.

9. The gas turbine engine of claim 7 further characterized in that said means responsive to said actuator includes a crank arm carried by said panel and operatively connected to said actuator.

10. The gas turbine engine of claim 5 further characterized in that said body of sound absorbing material comprises at least one acoustically treated panel, said moving means including an actuator and means responsive thereto including a gear track carried by said panel, a spur gear rotatably carried by said first structural portion in driving engagement with said gear track, and a ring gear rotatably carried by said first structural portion engaging said spur gear and connected for rotation to said actuator.